(12) United States Patent
Maegawa (10) Patent No.: US 8,082,142 B2
(45) Date of Patent: Dec. 20, 2011

(54) SPEECH RECOGNITION METHOD, SPEECH RECOGNITION SYSTEM AND SERVER THEREOF

(75) Inventor: Shuhei Maegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 952 days.

(21) Appl. No.: 12/047,020

(22) Filed: Mar. 12, 2008

(65) Prior Publication Data
US 2009/0070102 A1 Mar. 12, 2009

(30) Foreign Application Priority Data

Mar. 14, 2007 (JP) ................................. 2007-065081

(51) Int. Cl.
*G06F 17/28* (2006.01)
(52) U.S. Cl. ................................. 704/2; 704/9; 704/277
(58) Field of Classification Search .................. 704/9, 2, 704/277 M, 277
See application file for complete search history.

(56) References Cited

U.S. PATENT DOCUMENTS

| | | | |
|---|---|---|---|
| 7,643,985 B2 * | 1/2010 | Horvitz ............................. | 704/2 |
| 2005/0192811 A1 * | 9/2005 | Parks et al. .................... | 704/277 |
| 2008/0177528 A1 * | 7/2008 | Drewes ............................ | 704/2 |
| 2008/0262828 A1 * | 10/2008 | Och et al. .......................... | 704/3 |

FOREIGN PATENT DOCUMENTS

| | | | |
|---|---|---|---|
| JP | 1998136327 A | 5/1998 |
| JP | 2000242645 A | 9/2000 |
| JP | 2003141113 A | 5/2003 |
| JP | 2004101727 A | 4/2004 |

OTHER PUBLICATIONS

Noth et al., "Multilingual speech recognition" In: Ponting, K. (Ed.), Computational models of speech pattern processing. NATO ASI Series F. Berlin, Germany, pp. 363-375).*
Jonson, R. "Multilingual NLP Methods for Multilingual Dialog Systems" Dec. 2002, http://w3.msi.vxu.se/~nivre/teaching/gslt/RebecaNLP.pdf), hereinafter referred to as Jonson.*
Japanese Office Action for JP Patent Application 2007-065081, issued Dec. 26, 2008.
Hiroaki Nanjo, et al. "Automatic Speech Recognition for Bilingual Speech using Statistical Machine Translation", Proceedings of the First Spoken Document Processing Workshop, Media Science Research Center of Toyohashi University of Technology, Feb. 27, 2007, p. 147-152.

* cited by examiner

*Primary Examiner* — Vincent P Harper (57) ABSTRACT

A speech recognition method includes a model selection step which selects a recognition model and translation dictionary information based on characteristic information of input speech and a speech recognition step which translates input speech into text data based on the selected recognition model and translation step which translates the text data based on the selected translation dictionary information.

21 Claims, 12 Drawing Sheets

CONFERENCE NOTICE 5011

「Developer Conference」

■Promter Maria Orion

■Day Wed. 12/06/05  10:15a. m~12:00p. m

■Participant Taro Yamada, Ben Franklin, Chin Tantan

■Location Tokyo Big site, Peking office

■Agenda
·In Regard To Speech Function http://www.vision.co.jp/func
·direction for software  http://www.visvoice.com/dev
·Copper Products http://www.visvoice.cn/hd

CONFERENCE DATA ON CONFERENCING DATABASE 5021

```
<?xml version="1.0" encoding=utf_8"?>
<conference title="Guide to conference"id="20061207130001">
 <participant id="000001">Taro Yamada</paticipant>
 <start>8:00</start>
 <end>10:00</end>
 <participant id="000001">Taro Yamada</patricipant>
 <participant id="000008">Naruhiro Ryuzoji</participant>
 <participant id="000009">Ouji Otomo</participant>
 <place address="0083947">Osaka-jo (castle) Hall</place>
 <place address="0083937">Kyoushu Brach</place>
 <resume url="http://www.visvoice.co.jp/mk1">Market Analysis 1</resume>
 <resume url="http://www.visvoice.co.jp/mk1">Market Analysis 2</resume>
 <resume url="http://www.visvoice.co.jp/mk3">Schedule In Future</resume>
 </subject>
 <subject titleid=" ">....</subject>
 <subject title="Developer Conference"id="20061206101501">
 <promoter id=000020">Maria Orion</promoter>
 <start>06/12/2006 10:15</start>
 <end>06/12/2006 12:00</end>
 <participant id=" 000001">Taro Yamada</participant>
 <participant id=" 000002">Ben Franklin</participant>
 <participant id=" 000003">Chin Tantan</participant>
 <place address=" 0789347">Tokyo Big Site</place>
 <place address=" 0094047">Peking office</place>
 <resume url="http://www.visvoice.co.jp/func">In Regard To Speech Recognition Function</resume>
 <resume url="http://www.visvoice.com/dev">direction for software</resume>
 <resume url="http://www.visvoice.cn/hd">Copper Products</resume>
 </subject>
 </conference>
```

DATA REGISTRATION

SPEECH RECOGNITION METHOD, SPEECH RECOGNITION SYSTEM AND SERVER THEREOF

This application is based upon and claims the benefit of priority from Japanese patent application No. 2007-65081, filed on Mar. 14, 2007, the disclosure of which is incorporated herein in its entirety by reference.

BACKGROUND OF THE INVENTION

The present invention relates to a speech recognition method, a speech recognition system, and a server thereof, and more particularly to a speech recognition method, a speech recognition system, and a server thereof, enabling to translate input speech of plurality languages into a specific language effectively.

A minutes recording unit integrating a speech recognition function and a translation function is not yet proposed at present.

Figure 12:
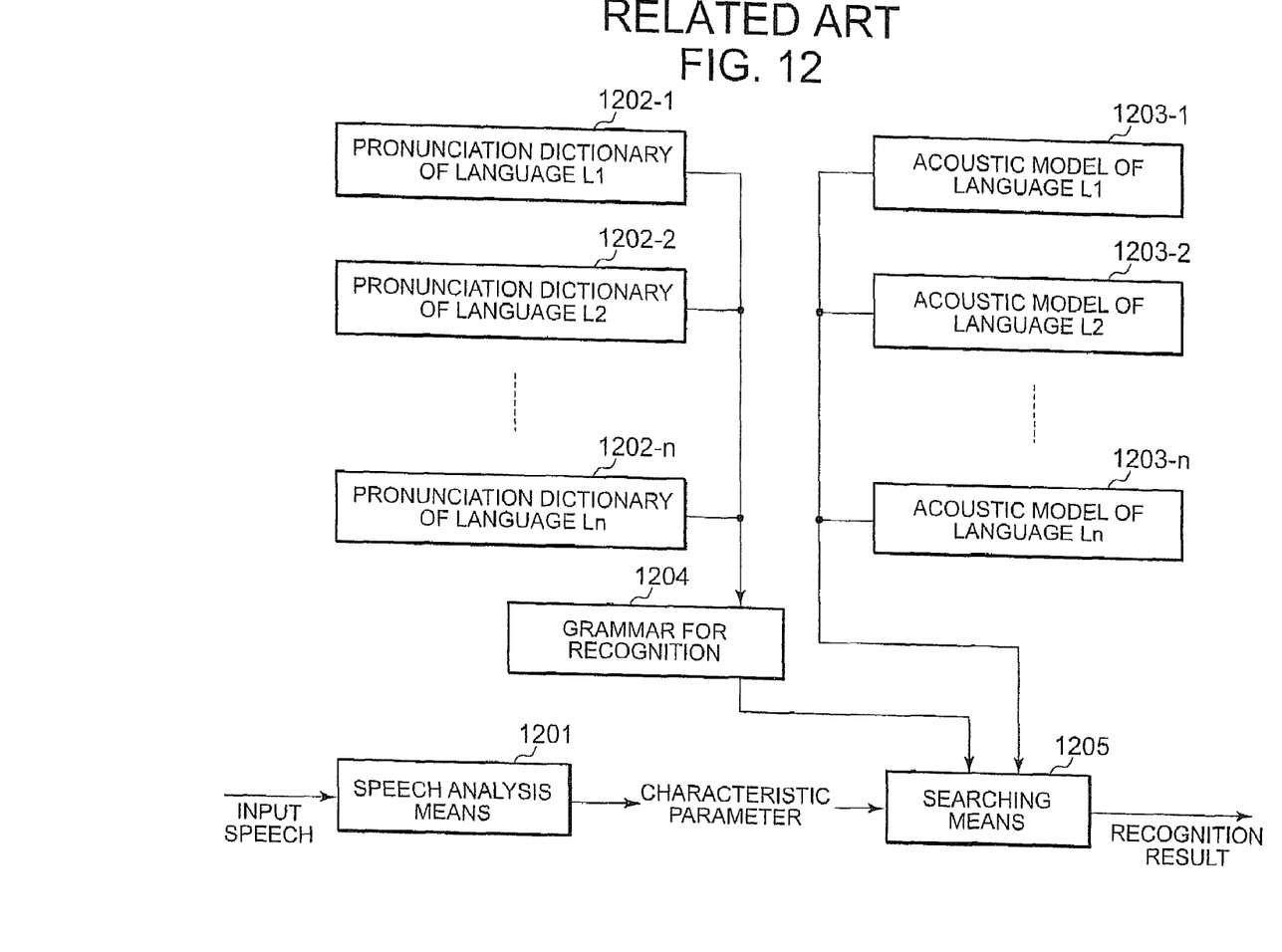
FIG. 12 is a schematic diagram showing a structure of a speech recognition unit of the related art.

As a technology in relation with speech recognition, for example, JP-A No. 2004-101727 discloses a speech recognition apparatus with speech recognition function of multiple languages. This speech recognition apparatus includes a pronunciation dictionary 1202 for plural languages, an acoustic model 1203 corresponding to the pronunciation dictionary 1202, a grammar 1204 for recognition, a speech analysis means 1201, and a searching means 1205. The recognition grammar 1204 is made based on the words defined by the pronunciation dictionary 1202. The recognition grammar 1204 is formed in multiple languages. In this a speech recognition apparatus, the speech analysis means 1201 extracts characteristic parameters from input speech. The searching means 1205 collates the characteristic parameters and a line of words of the recognition grammar using the acoustic model and outputs a line of words having the highest collation score as a recognition result. Here, it is assumed that an invention disclosed in the JP-A No. 2004-101727 is applied to recording of the conference minutes. In this case, a user needs to prepare a translation dictionary and update such a translation dictionary.

As a related art, a minutes recording unit with speech recognition function has also been proposed. Moreover, when a translation function is applied to this invention, it is possible to translate conference minutes. However, in such minutes recording unit, there is a problem that the conference minutes are outputted in multiple languages because speeches are recognized with a language used by a speaker.

Moreover, there is also a problem that plural translation dictionaries of a translation origin and a translation destination must be prepared. Moreover, there is also a problem that translation has to be conducted after designating a language of translation origin and a language of translation destination.

Accordingly, it is an object of the present invention to provide a speech recognition method, a speech recognition system and a server thereof for enabling to translate input speech of plurality languages into a specific language effectively.

SUMMARY OF THE INVENTION

An object of the present invention is to provide a speech recognition method, a speech recognition system, and a server thereof which can translate input speech of plurality languages into a specific language effectively.

According to one aspect of the present invention, there is provided a speech recognition method which includes a model selection step which selects a recognition model based on characteristic information of input speech and a speech recognition step which translates input speech into text data based on the selected recognition model.

According to one aspect of the present invention, a server is connected to a distribution terminal distributing a recognition model and a user terminal recognizing input speech and a translation terminal translating a speech recognition result of the user terminal through a network, and the server includes a model selection unit which selects a recognition model and translation dictionary information based on characteristic information of input speech and an indication unit which indicates the selected recognition model to the user terminal and indicates the selected translation dictionary information to the translation terminal.

According to one aspect of the present invention, a speech recognition system includes a model selection unit which selects a recognition model and translation dictionary information based on characteristic information of input speech and a speech recognition unit which transmits input speech into text data based on the selected recognition model and a translation unit which translates the text data based on the selected translation dictionary information.

BRIEF DESCRIPTION OF THE DRAWINGS

Other features and advantages of the invention will be made more apparent by the following detailed description and the accompanying drawings, wherein:

FIG. 5 is a diagram showing examples of a conferencing notice and a conferencing data;

In the drawings, the same reference numerals represent the same structural elements.

DETAILED DESCRIPTION OF THE PREFERRED EMBODIMENTS

The present invention will be described in detail below with reference to the accompanying drawings.

One of the features of the present invention is to record minutes of the conference held in plural languages using the language just suitable for a user.

A first embodiment of the present invention will be described in detail below.

Figure 8:
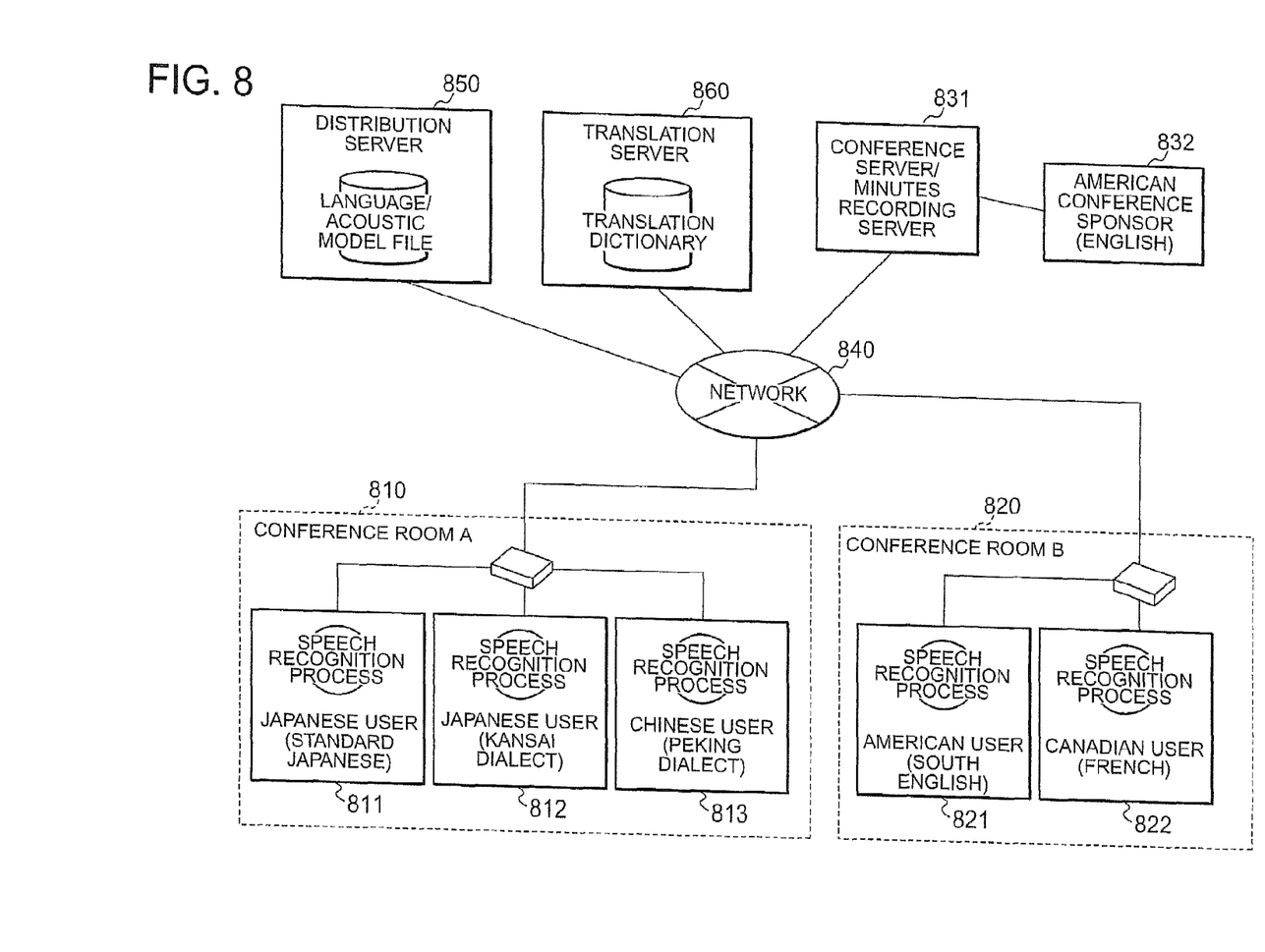
FIG. 8 is a diagram indicating concept of a structure of the minutes recording unit.

As shown in FIG. 8, terminals (811, 812, and 813) in a conference room A, terminals (821, 822) in a conference room B, a distribution terminal (850, . . . ), a translation terminal (860, . . . ), and a server 830 are connected with a network 840. The distribution terminal (850, . . . ) is a terminal used to distribute a recognition model. Plural distribution terminals (850, . . . ) are connected to the network 40. The translation terminal (860, . . . ) is a terminal for storing a translation dictionary information. Plural translation terminals are connected to the network 40. Here, a conferencing server/minutes recording server 831 will be explained as an example of the server 830. Moreover, a distribution server (850, . . . ) will be explained as an example of the distribution terminal (850, . . . ). A translation server (860, . . . ) will be explained as an example of the translation terminal (860, . . . ). A conference sponsor 832 registers, before conferencing, characteristic information to the conferencing server 831. The characteristic information includes subject information, language information, relevant information relating to input speech, and language information for translation. The language information includes dialect information. The relevant information relating to input speech includes resume information of the conference. The language information for translation includes language information of translation origin and language information of translation destination. For example, the information, "a conference sponsor is an American speaking standard English and the conference sponsor records conference minutes in standard English to easily understand the contents thereof. A user utilizing the terminal 811 in the conference room A speaks standard Japanese. A user utilizing the terminal 812 in the conference room A speaks Japanese including Kansai dialect . . . . " is stored as the characteristic information. The conferencing server 831 automatically selects a recognition model most suitable for the conferencing server from the distribution server 850 on the basis of the conferencing database storing the characteristic information. The terminals (811, 812, 813, 821, and 822) in the conference rooms A and B download the selected recognition models before conferencing. The recognition model includes a language model and an acoustic model. Moreover, the conferencing server 831 automatically selects the translation dictionary information most suitable for the characteristic information from the translation server 860 on the basis of the conferencing database 830.

In regard to translation dictionary information, on the occasion of translating the subject of chemistry, for example, from Japanese into English, the conferencing server 831 selects a Japanese-English dictionary for chemistry. Moreover, on the occasion of translating the subject of information science from Japanese into English, the conferencing server 831 selects a Japanese-English dictionary for information science.

Automatic selection of the dictionary is conducted as follows. Namely, a language zone is determined in the top domain of URL (.us is searched for translation into Great Britain English, while .jp for Japanese, and .cn for Chinese). In this case, a field of the Web service is further selected more narrowly by checking a sub-domain of URL (or a response indicating the subject of which field the relevant domain has is obtained by sending an inquiry to the Web service).

At this time, each of the terminals (811, 812, 813, 821, and 822) in the conference rooms A and B is executing a speech recognition process and an IP telephone service. A user's speech inputted through a microphone connected to each of the terminals (811, 812, 813, 821, and 822) in the conference can be heard at each of those terminals. The speech recognition process starts speech recognition after switching to the downloaded recognition model. Accordingly, each terminal can automatically record the optimum recognition result for each language (example: a user 812 speaks with Kansai dialect) of a user. Simultaneously, the speech recognition result is transmitted to the minute recording server 831 via the network 840 and is registered as the conference minutes data. The minutes server 831 can translate such minutes data into the desired language (for example, contents of the Japanese speech with Kansai dialect spoken by a user 812 are translated into standard English). Each terminal can refer to the translated conference minutes by accessing to the conference minutes recording server 830.

Figure 1:
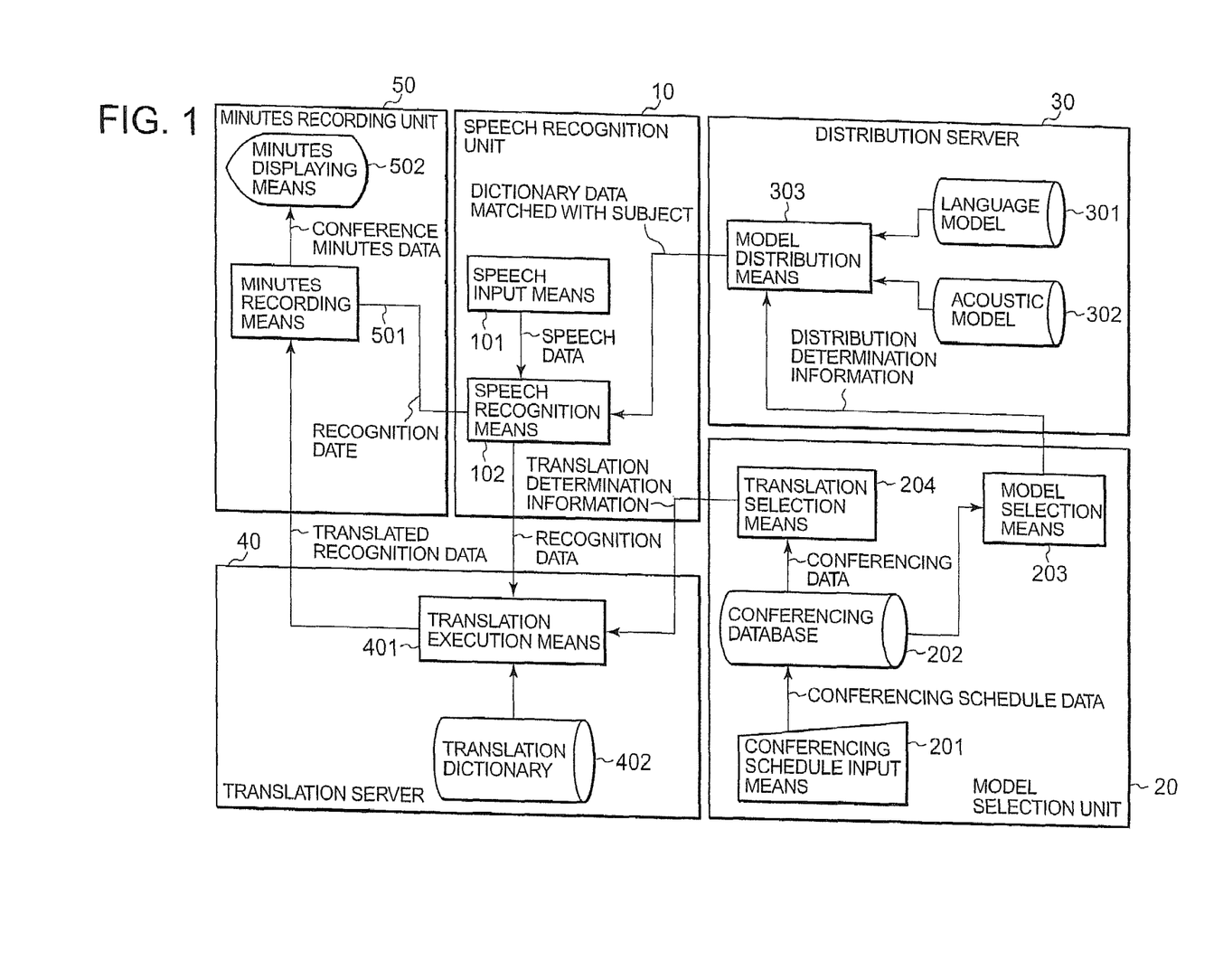
FIG. 1 is a block diagram showing a structure of a minutes recording unit of a first embodiment of the resent invention.

Next, a structure of the first embodiment of the present invention will be explained in detail with reference to the accompanying drawings. With reference to FIG. 1, the first embodiment of the present invention include a speech recognition unit 10, a model selection unit 20, a distribution server 30, a translation server 40, and a minutes recording unit 50. The speech recognition unit 10 includes a speech input means 101 and a speech recognition means 102. The model selection unit 20 includes a conferencing schedule input means 201, a conferencing database 202, a model selection means 203, and a translation selection means 204. The distribution server 30 includes a language model 301, an acoustic model 302, and a model distribution means 303. The translation server 40 includes a translation executing means 401 and a translation dictionary 402. The minutes recording unit 50 includes a minutes recording means 501 and a minutes displaying means 502.

These means schematically operate as follows, respectively. The conference sponsor 832 inputs characteristic information, before conferencing, with the conferencing schedule input means 201 and stores the same characteristic information to the conferencing database 202. The model selection means 203 selects adequate language model and acoustic model on the basis of the characteristic information of the conferencing database 202, notifies the selected language model and acoustic model to each terminal (811, 812, 813, 821, and 822) in order to control such terminal to download the language model and acoustic model. The translation selection means 204 selects adequate translation execution means 401 on the basis of the characteristic information of the conferencing database 202. The speech recognition means 102 executes the speech recognition process in accordance with a speech inputted from the speech input means 101 and a dictionary data obtained from the model distribution means 303 and translates the input speech into a text data as the recognition data. The speech recognition means 102 transfers the recognition data to the translation execution means 401. The translation execution means 401 selects the translation dictionary 402 and translates the recognition data on the basis of the translation determination information transferred from the translation selection means 204. Thereafter, the translation execution means 401 transmits the translated recognition data to the minutes recording means 501. The minutes recording means 501 receives the translated recognition data which is enough for users participating in the conference through the network and records the conference minutes data. Moreover, the minutes recording means 501 can also record the minutes data by receiving the data before recognition. The minutes displaying means 502 displays the minutes data on the displaying screens of users. Here, the translation determination information includes the language information of translation origin and the language information of translation destination. Moreover, the data before recognition is digital speech itself.

Figure 2:
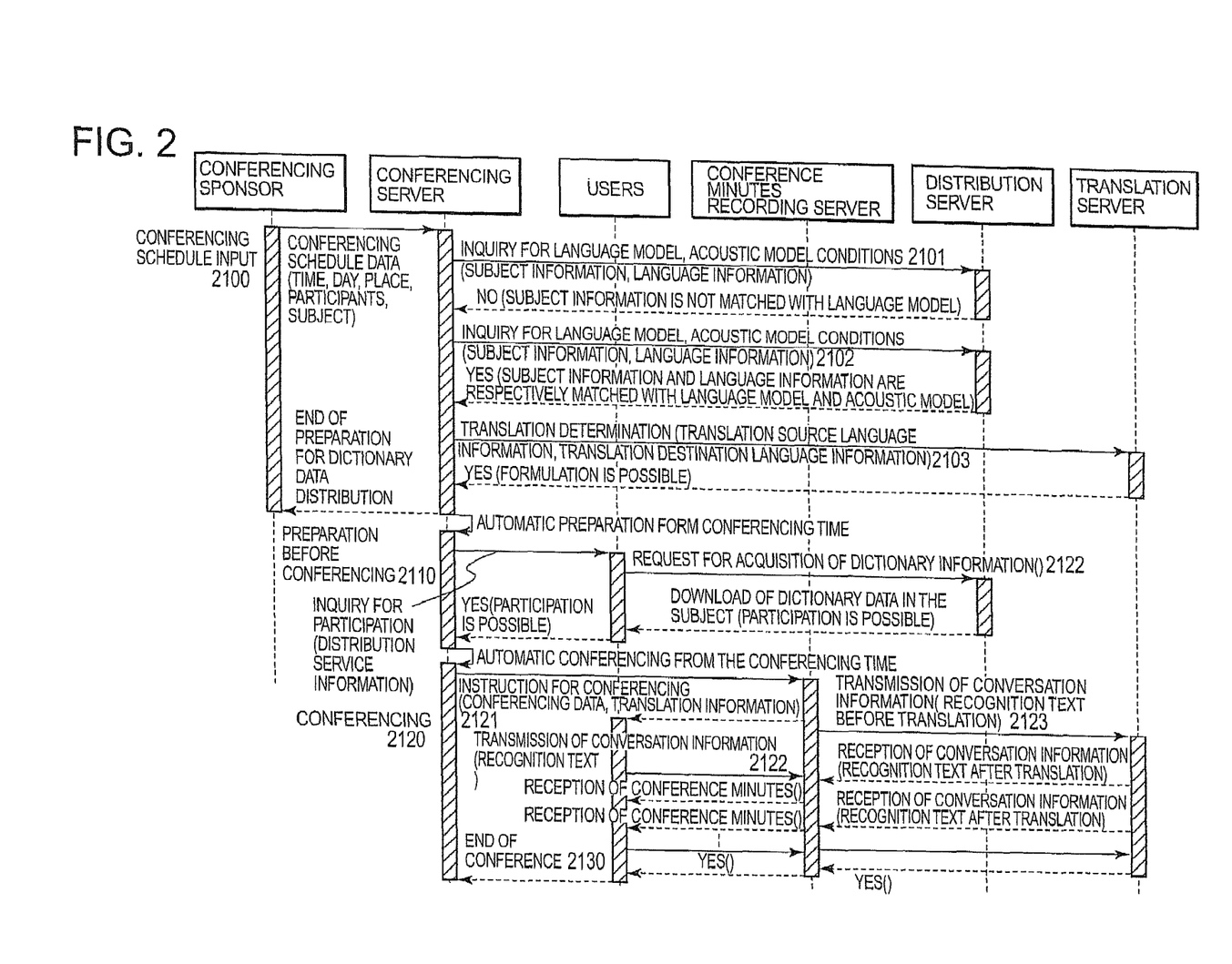
FIG. 2 is a sequence diagram showing operations of the minutes recording unit.

Next, operations of the first embodiment of the present invention will be explained in detail with reference to the sequence diagram of FIG. 2 and activity diagrams of FIG. 3, FIG. 4, and FIG. 9. First, the conference sponsor 832 inputs previously the conferencing schedule before conferencing and registers the conferencing schedule data to the conferencing server 831 (2100 in FIG. 2). FIG. 5 shows an example in which a conferencing notice 5011 translated to the XML data is registered as a conferencing data 5021. Next, the conferencing server 831 searches the optimum distribution server (550, . . . ). In FIG. 2, the conferencing server 831 inquires subject information and language information as the characteristic information to the translation source. If the subject information is not matched with the language model in the distribution server to which an inquiry is conducted, namely if the language model corresponding to the subject information is not prepared, a response indicating mismatch is received from the distribution server (2101 in FIG. 2). Moreover, another enquiry is conducted to the other distribution server. As a result, the conferencing server 831 receives a response, from a certain distribution server, indicating that the subject information and language information are respectively matched with the language model and acoustic model (2102 in FIG. 2). That the language model is optimum to the subject of conference means that the dictionary is suitable to such field. Matching between the language model and the subject of conference means that the language model is nearest to the subject. Here, matching means an increase in a recognition rate.

Figure 3:
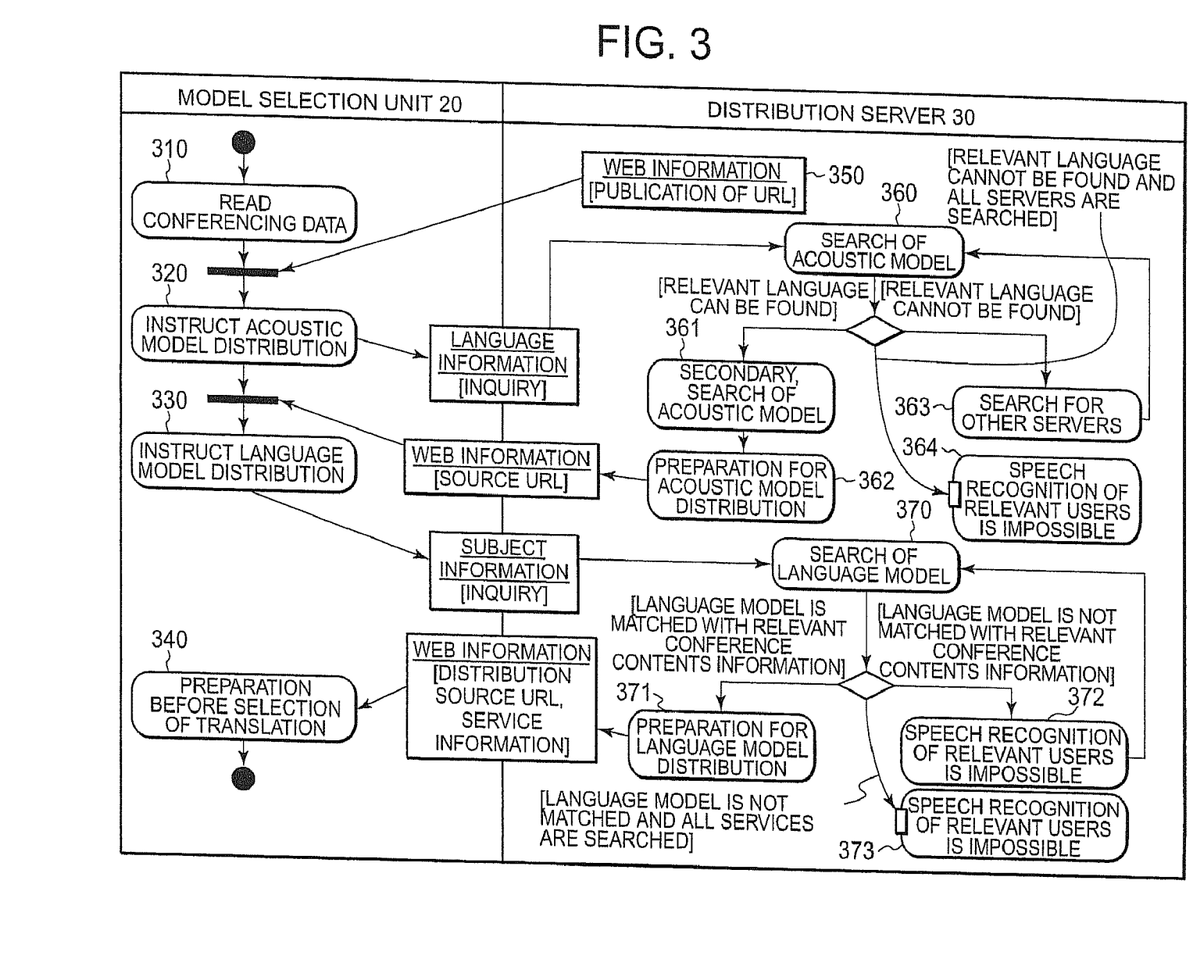
FIG. 3 is a first activity diagram showing operations of the minutes recording unit.

FIG. 3 shows detail of the processes up to response from inquiry.

The model selection unit 20 acquires the Web information from the distribution server 30 and reads the conferencing data (310, 350 in FIG. 3). The model selection unit 20 issues an acoustic model distribution instruction 320. The distribution server 30 conducts acoustic model search 360. FIG. 4 shows detail of the acoustic model distribution instruction 320 in FIG. 3.

Figure 4:
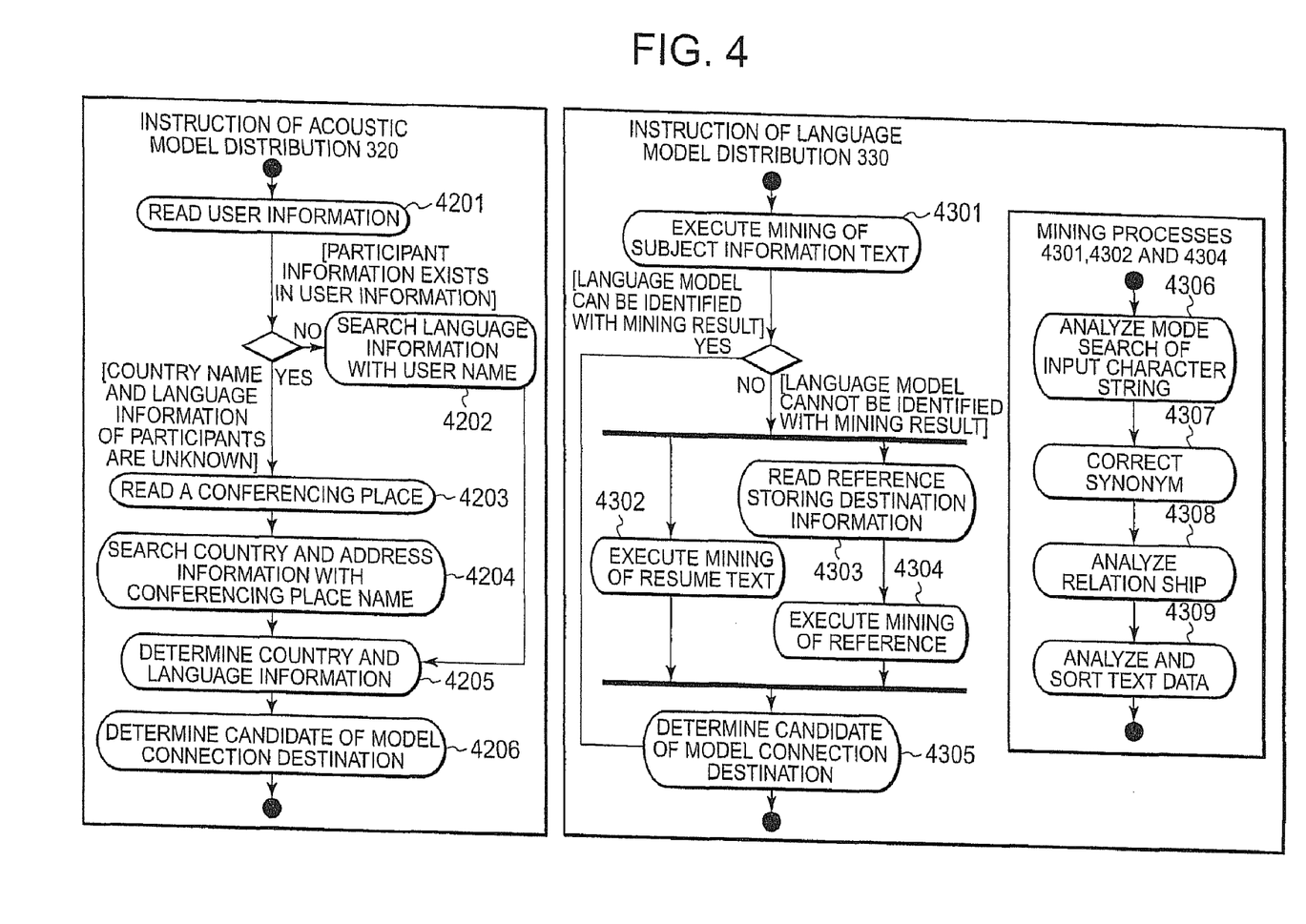
FIG. 4 is a second activity diagram showing operations of the minutes recording unit.
Figure 6:
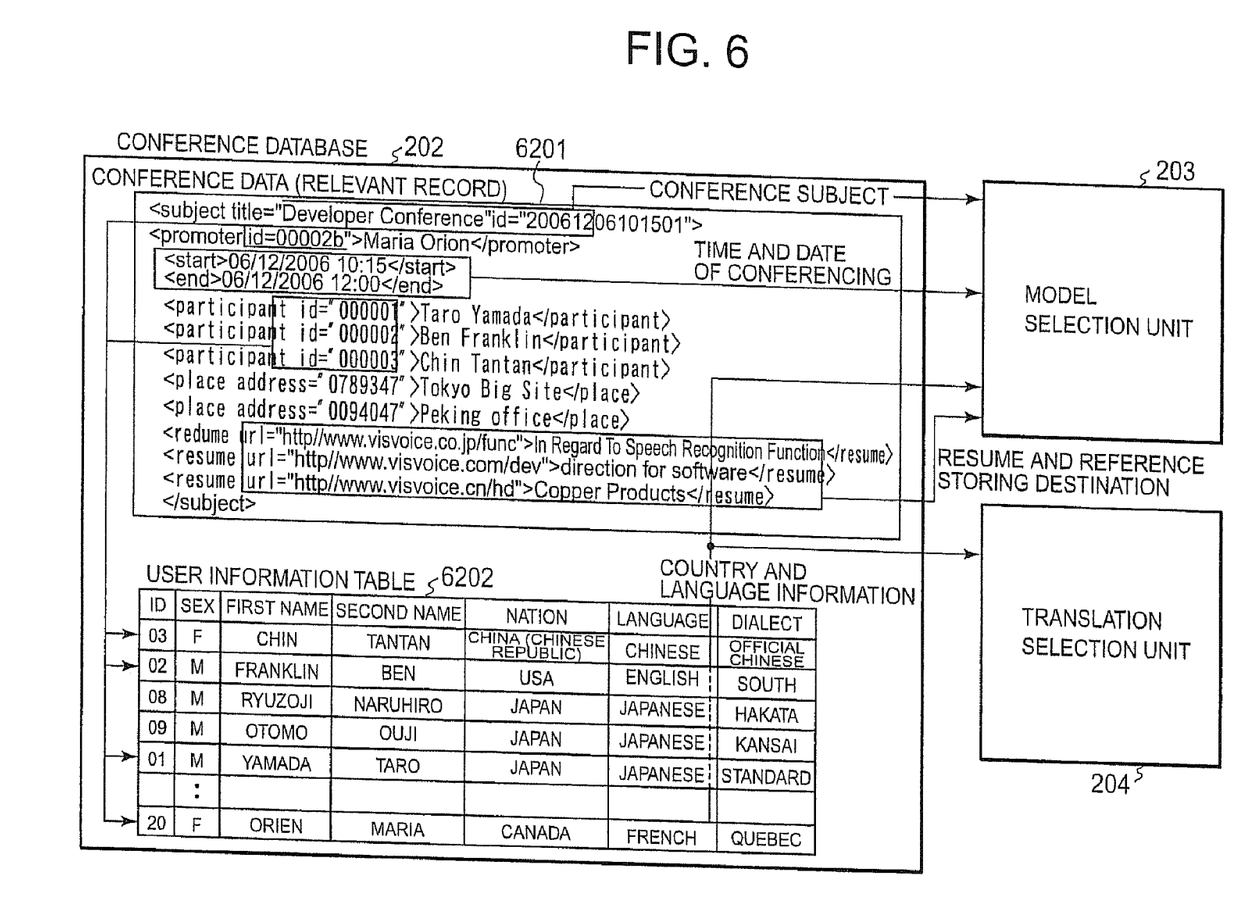
FIG. 6 is a diagram showing examples of a conferencing data and a user information table.
Figure 7:
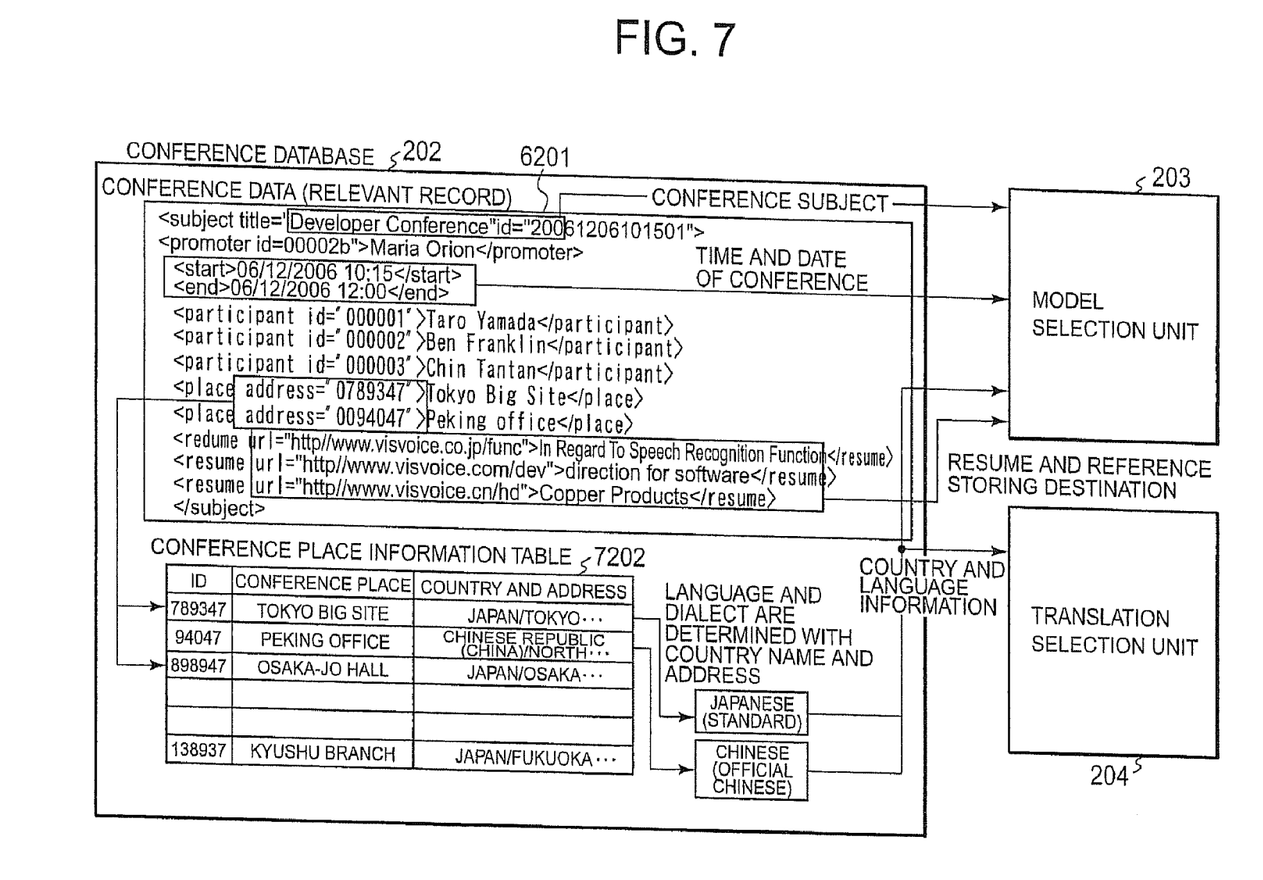
FIG. 7 is a diagram showing examples of a conferencing data and a conferencing place information table.

The model selection unit 20 searches and extracts a language information (4202, 4205 in FIG. 4) when the language information exists in the user information as a result of reading the user information (4201 in FIG. 4). FIG. 6 shows an example that a user information table 6202 is prepared together with the conferencing data 6201 and the subject information and the language information are transmitted to the model selection unit 203 on the basis of these data. If the language information cannot be identified, the model selection unit 20 reads a conferencing place and determines the language information from a name of the place (4203, 4204 in FIG. 4). FIG. 7 shows an example that a conferencing place table 7202 is prepared together with the conferencing data 6201 and the subject information and the language information are transmitted to the model selection unit 203 and the translation selection unit 204 based on the above data. The model selection unit 20 determines connection destination information as explained above (4206 in FIG. 4).

In the acoustic model search 360 in FIG. 3, the distribution server 30 searches the relevant language based on the language information transmitted. If the relevant language information cannot be found within the own server, the distribution server 30 searches 463 the other servers as many as the number of distribution servers. When the servers are found, the distribution server 30 determines the acoustic model matched with the dialect information included in the language information in the process of the secondary search 361 of acoustic model and prepares 362 for distribution of the acoustic model. The distribution server 30 returns the distribution source URL information to the conferencing server 831 in the process of acoustic model distribution preparation 362. The acoustic model download source is determined as explained above.

Next, the model selection unit 20 issues a language model distribution instruction 330. With issuance of the language model distribution instruction 330, the subject information is transmitted to the distribution server 30. Here, the distribution server 30 executes the language model search 370. FIG. 4 shows detail of the language model distribution instruction 330.

The model selection unit 20 mines a text of the subject information from the conferencing data 6201 (4301 in FIG. 4). When the language model can be identified based on the result of mining (4305 in FIG. 4), model selection unit 20 determines the model connection destination information in this timing. When the language model cannot be identified from the result of mining, the model selection unit 20 mines a text of the resume information as the related information of the input speech (4302 in FIG. 4) and simultaneously conducts download of information from the reference storing destination and mining of the reference text (4303, 4304 in FIG. 4). The model connection destination information is determined from both results of the mining processes (4305 in FIG. 4).

In the language model search 370 in FIG. 3, the distribution server 30 searches the language model based on the subject information transmitted. If such language model cannot be found in the own server, the distribution server 30 executes another server searching 372 as many times as the number of distribution servers. In preparation 371 of the language model distribution, the distribution server 30 determines the language model matched with the subject information and returns the relevant URL and service information to the conferencing server 831. The distribution server 30 prepares distribution of the dictionary data before conferencing by repeating issuance of the acoustic model distribution instruction and language model distribution instruction 330 that is enough for the number of users.

FIG. 2 shows a situation in which translation is possible in the result of sending an inquiry from the conferencing server 831 to the translation server 860 based on the language information of translation origin and the language information of translation destination. (2103 in FIG. 2).

Figure 9:
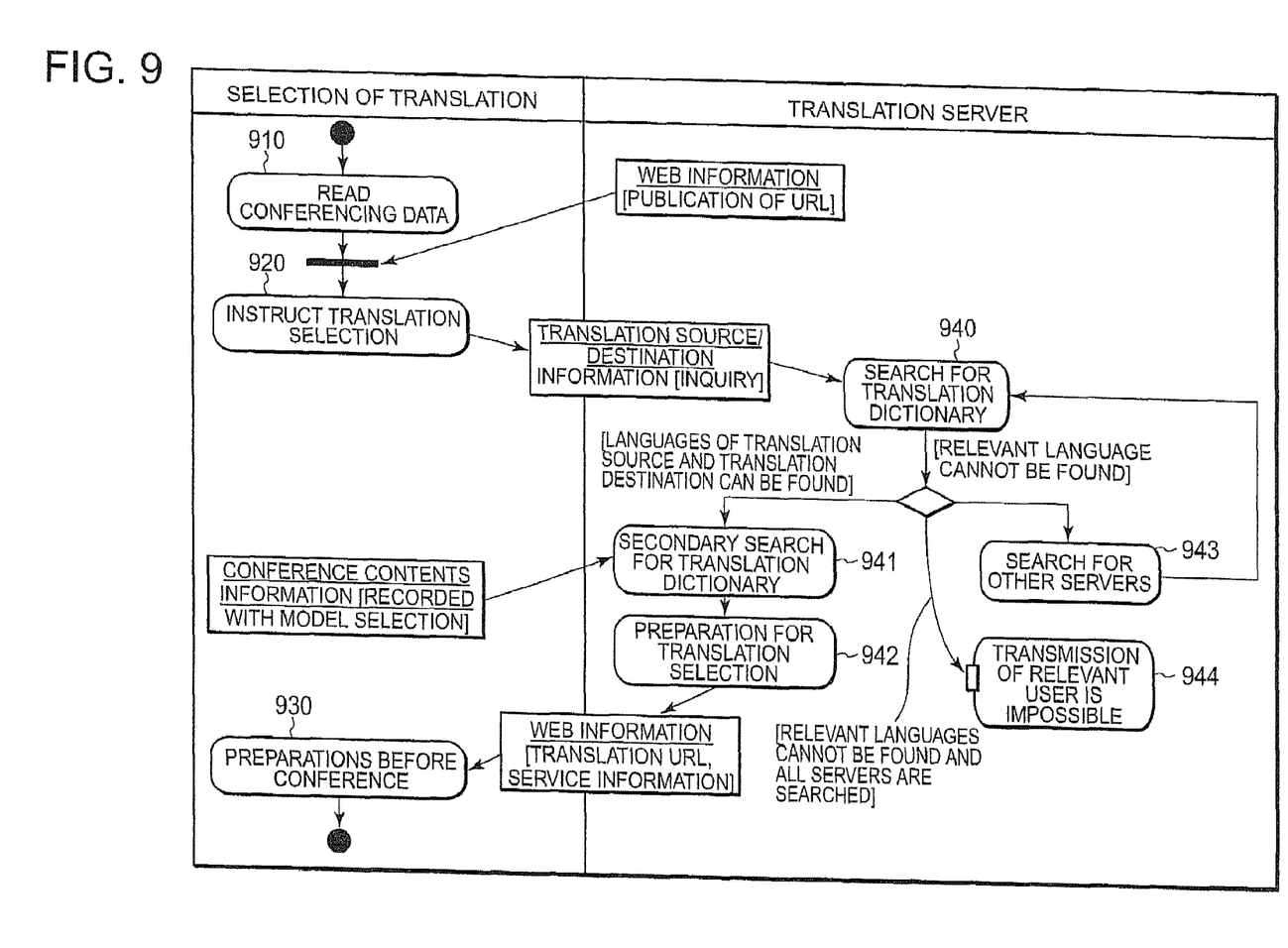
FIG. 9 is a third activity diagram showing operations of the minutes recording unit.

FIG. 9 shows a detail of the processes from an inquiry to a response. The translation selection means 204 acquires the Web information from the translation server means 40 to read the conferencing data (910 in FIG. 9). The translation selection means 204 further issues 902 a translation selection instruction (920 in FIG. 9). In the translation selection instruction 920, the language information of translation origin and the language information of translation destination are transmitted to the translation dictionary search 940 of the translation server means 40. The language information of translation origin is the language information of users of respective terminals (811, 812, 813, 821, and 822) and can be acquired automatically. The language information of translation destination is uniquely determined for each conference, for example, the language information of the conference sponsor 832 is selected. The translation dictionary search 940 in FIG. 9 searches the relevant language on the basis of the language information of translation origin and the language information of translation destination. If the relevant language cannot be found in the own server, search 943 of the other server is repeated as many times as the number of translation servers 860. When the relevant language can be found, the secondary search of translation dictionary 941 refers to the subject information already recorded with language model selection and determines a dictionary of the relevant field assumed that translation accuracy is improved. Moreover, the translation server means 40 returns, in translation selection preparation 942, the connection destination URL information and service information to the conferencing server 831. The translation server connection destination is determined as many as the number of users.

The conferencing server 831 confirms that users can participate in the conference or not before conferencing (2111 in FIG. 2). The users who can participate download the dictionary data from the distribution server (550, . . . ) (2112 in FIG. 2). When the conferencing time has come, the conferencing server 831 transmits the conferencing data to the minutes recording server 831 (2121 in FIG. 2). Accordingly, each terminal (811, 812, 813, 821, and 822) can receive the input speeches as the conference minutes (2122 in FIG. 2). The minutes recording server 531 records the conference minutes until the conference comes to the end (2123, 2130 in FIG. 2).

Next, an effect of the first embodiment of the present invention will be explained below. In the first embodiment of the present invention, the language model and acoustic model matched with the subject information are automatically downloaded on the basis of the conferencing data and the downloaded language model and the downloaded acoustic model is used as a speech recognition dictionary. And a translation dictionary which is suitable to the subject information and user is prepared. Therefore, it is possible to expect the recognition result matched with the subject and the translation result based on the recognition result (moreover, in the first embodiment of the present invention, when the language model translating into the standard language from each regional dialect language is prepared, the language information of translation origin can be saved because translation is executed after each spoken dialect language is converted to the standard language).

Figure 10:
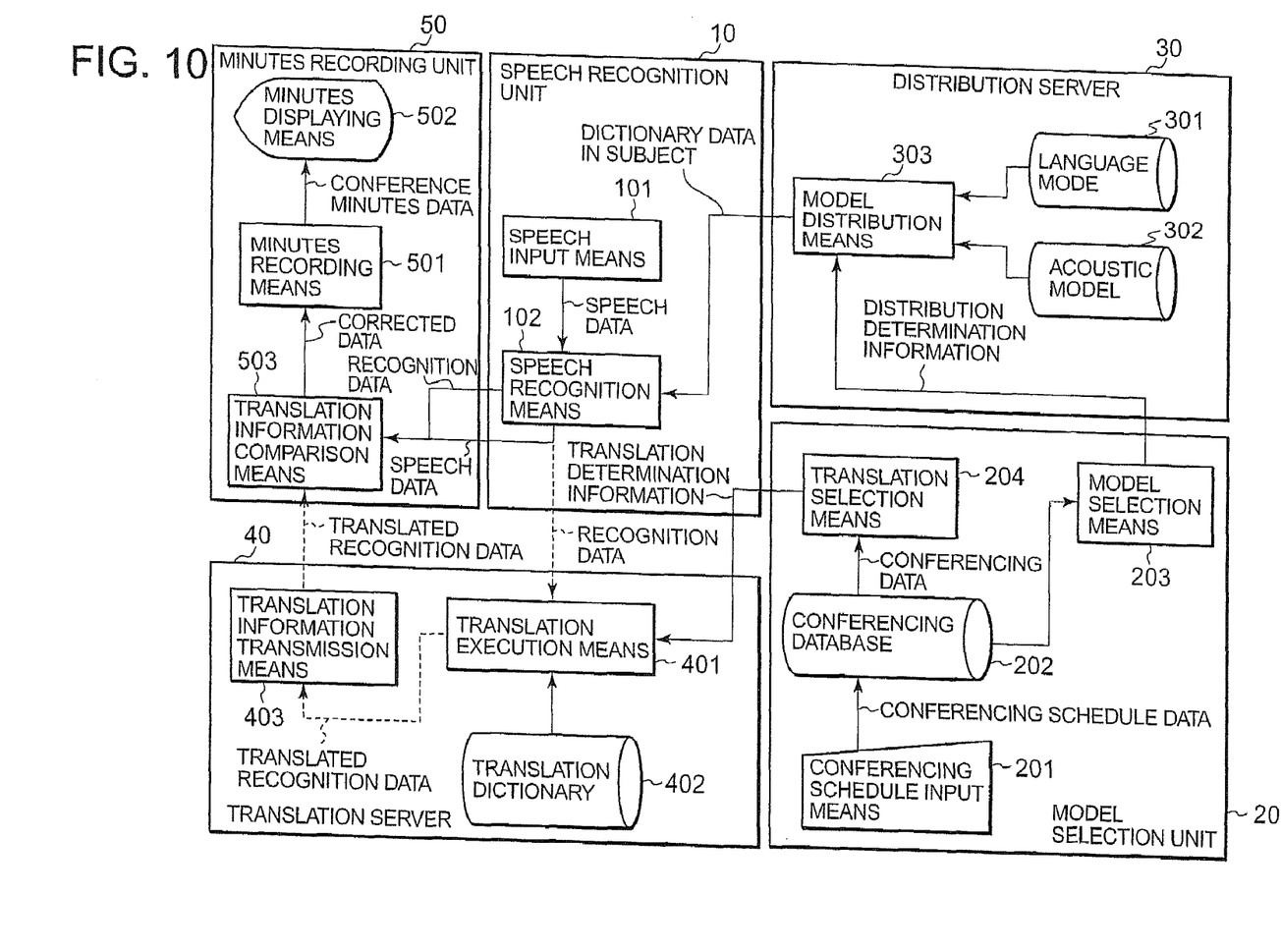
FIG. 10 is a block diagram showing a structure of the minutes recording unit of a second embodiment of the present invention.

Next, a structure of a second embodiment of the present invention will be explained with reference to the accompanying drawings. Referring to FIG. 10, the second embodiment of the present invention is constituted by adding a translation information comparison means 503 and a translation information transmission means 403 to the structure of the first embodiment. Namely, in addition to the processes by the speech recognition unit 10, model selection unit 20, distribution server 30, translation server 40 and minutes recording unit 50 in the structure of the first embodiment, the speech recognition unit 102 transmits asynchronously the recognition data to the translation server 40 and a transmission information transmission means 403 transmits the translated recognition data to the transmission information comparison means 503 in the timing of the end of translation by the translation execution means 401 and an event by timer etc. The translation information comparison means 503 confirms whether the translation is accurate or not based on the translated recognition data, the recognition data before translation, and the speech data before translation. Moreover, the translation information comparison means 503 transmits the corrected data to the c minutes recording means 501. In the second embodiment of the present invention, the users can acquire the translation data anytime and anywhere. As explained above, it is possible to acquire the recognition result which is matched with the subject and which is translated into the language of the own country.

Figure 11:
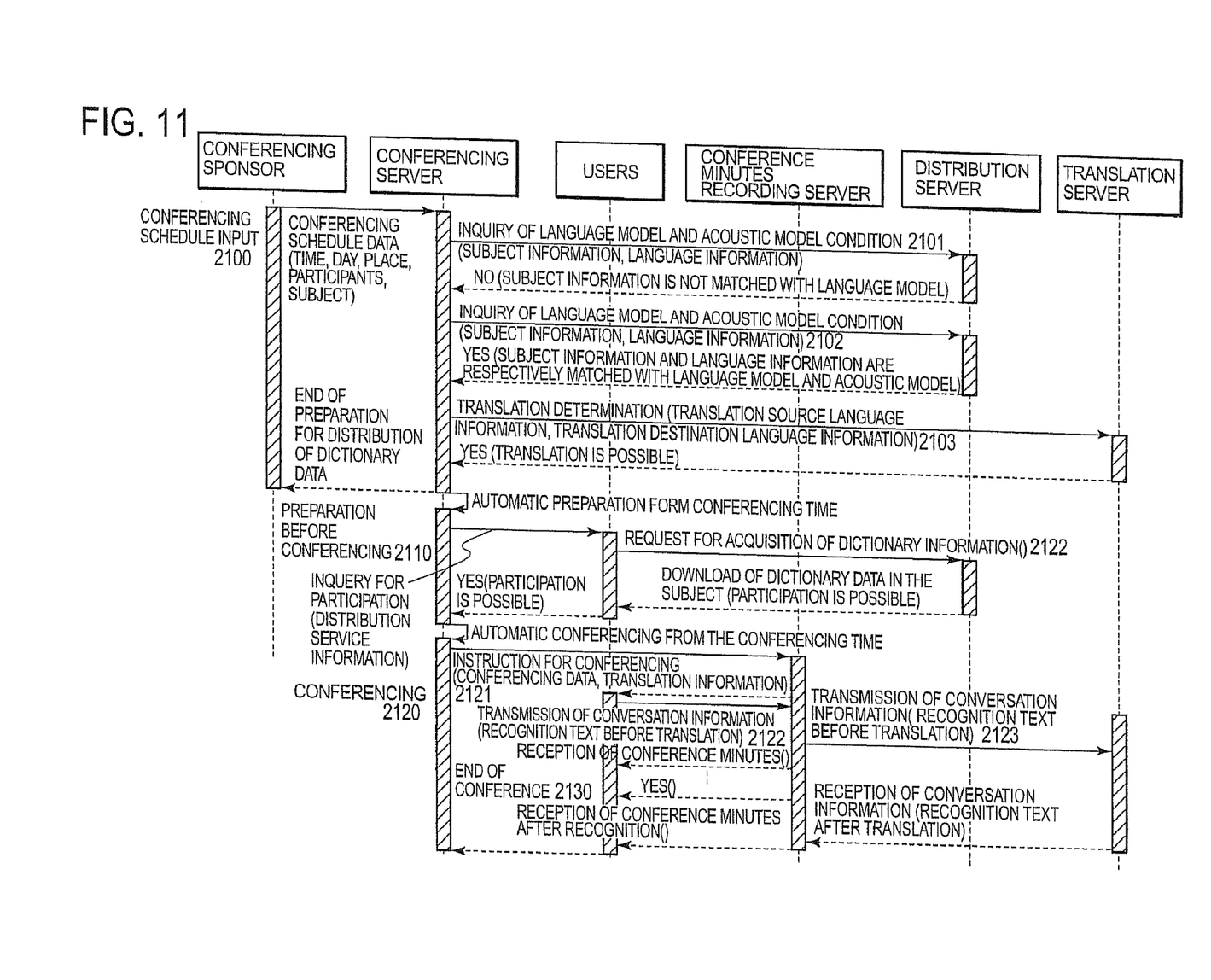
FIG. 11 is a sequence diagram showing operations of the minutes recording unit.

FIG. 11 is a sequence diagram showing operations of the minutes recording unit in the second embodiment of the present invention. Difference from the first embodiment is that the minutes recording server 831 and the translation server 860 operate asynchronously in FIG. 11. In the second embodiment, all of the conference minutes made by the minutes recording server 831 is translated in a lump.

What is claimed is:

1. A speech recognition method, comprising:
a model selection step which selects a recognition model and translation dictionary information based on characteristic information of input speech that is stored in a conferencing database;
a speech recognition step which translates input speech into text data based on said selected recognition model; and
a translation step which translates said text data based on said selected translation dictionary information,
wherein said model selection step selects said recognition model for each user of a plurality of users based on subject information and language information of each user that are stored in said conferencing database as part of said characteristic information,
and wherein said model selection step further selects said translation dictionary information based on said language information of each user and language information for translation that are stored in said conferencing database as part of said characteristic information.

2. The speech recognition method according to claim 1, wherein said model selection step selects said recognition model based on said characteristic information including the content information of the conversation.

3. The speech recognition method according to claim 1, wherein said language information for translation includes language information of translation origin and language information of translation destination.

4. The speech recognition method according to claim 3, wherein said language information of translation origin is the same as said language information of input speech.

5. The speech recognition method according to claim 1,
wherein said recognition model includes acoustic models and language models; and
wherein said model selection step selects an acoustic model among said acoustic models based on said language information of each user and selects a language model among said language models based on said subject information of input speech and selects translation dictionary information among said translation dictionaries based on said language information for translation.

6. The speech recognition method according to claim 5, wherein said model selection step selects said acoustic model and said translation dictionary information each for a user based on said dialect information of each user.

7. The speech recognition method according to claim 6,
wherein said characteristic information includes relevant information relating to input speech and said recognition model includes acoustic models and language models; and
wherein said model selection step selects an acoustic model among said acoustic models based on said language information and selects a language model among said language models based on said subject information and said relevant information and selects translation dictionary information among said translation dictionaries based on said language information for translation.

8. A server connected to a distribution terminal distributing a recognition model and a user terminal recognizing input speech and a translation terminal translating a speech recognition result of said user terminal through a network, said server comprising:

a conferencing database;

a model selection unit which selects a recognition model for each user of a plurality of users based on subject information and language information of each user that are stored in said conferencing database as part of characteristic information, and which selects translation dictionary information based on said language information of each user and language information for translation that are stored in said conferencing database as part of said characteristic information; and an indication unit which indicates said selected recognition model to said user terminal and indicates said selected translation dictionary information to said translation terminal.

9. The server according to claim 8, wherein said model selection unit selects said recognition model based on said characteristic information including the content information of the conversation.

10. The server according to claim 8, wherein said language information for translation includes language information of translation origin and language information of translation destination.

11. The server according to claim 10, wherein said language information of translation origin is the same as said language information of input speech.

12. The server according to claim 8, wherein said recognition model includes acoustic models and language models; and wherein said model selection unit selects an acoustic model among said acoustic models based on said language information of each user and selects a language model among said language models based on said subject information of input speech and selects translation dictionary information among said translation dictionaries based on said language information for translation.

13. The server according to claim 12, wherein said model selection unit selects said acoustic model and said translation dictionary information each for user based on said dialect information of each user.

14. The server according to claim 13, wherein said characteristic information includes relevant information relating to input speech and said recognition model includes acoustic models and language models; and wherein said model selection unit selects an acoustic model among said acoustic models based on said language information and selects a language model among said language models based on said subject information and said relevant information and selects translation dictionary information among said translation dictionaries based on said language information for translation.

15. A speech recognition system, comprising:

a conferencing database;

a model selection unit which selects a recognition model for each user of a plurality of users based on subject information and language information of each user that are stored in said conferencing database as part of characteristic information, and which selects translation dictionary information based on said language information of each user and language information for translation that are stored in said conferencing database as part of said characteristic information;

a speech recognition unit which translates input speech into text data based on said selected recognition model; and a translation unit which translates said text data based on said selected translation dictionary information.

16. The speech recognition system according to claim 15, wherein said model selection unit selects said recognition model based on said characteristic information including the content information of the conversation.

17. The speech recognition system according to claim 15, wherein said language information for translation includes language information of translation origin and language information of translation destination.

18. The speech recognition system according to claim 17, wherein said language information of translation origin is the same as said language information of input speech.

19. The speech recognition system according to claim 15, wherein said recognition model includes acoustic models and language models; and wherein said model selection unit selects an acoustic model among said acoustic models based on said language information of each user and selects a language model among said language models based on said subject information of input speech and selects translation dictionary information among said translation dictionaries based on said language information for translation.

20. The speech recognition system according to claim 19, wherein said model selection unit selects said acoustic model and said translation dictionary information each for a user based on said dialect information of each user.

21. The speech recognition system according to claim 20, wherein said characteristic information includes relevant information relating to input speech and said recognition model includes acoustic models and language models; and wherein said model selection unit selects an acoustic model among said acoustic models based on said language information and selects a language model among said language models based on said subject information and said relevant information and selects translation dictionary information among said translation dictionaries based on said language information for translation.

* * * * *